(12) United States Patent
Bégin-Drolet et al.

(10) Patent No.: US 10,712,301 B2
(45) Date of Patent: Jul. 14, 2020

(54) SYSTEM AND METHOD FOR DETERMINING AN ICING CONDITION STATUS OF AN ENVIRONMENT

(71) Applicant: UNIVERSITé LAVAL, Québec (CA)

(72) Inventors: André Bégin-Drolet, Québec (CA); Jean Ruel, Québec (CA); Jean Lemay, Québec (CA)

(73) Assignee: UNIVERSITÈ LAVAL, Quebec (CA)

( * ) Notice: Subject to any disclaimer, the term of this patent is extended or adjusted under 35 U.S.C. 154(b) by 229 days.

(21) Appl. No.: 15/557,283

(22) PCT Filed: Mar. 8, 2016

(86) PCT No.: PCT/CA2016/050251
§ 371 (c)(1),
(2) Date: Sep. 11, 2017

(87) PCT Pub. No.: WO2016/141477
PCT Pub. Date: Sep. 15, 2016

(65) Prior Publication Data
US 2018/0052125 A1 Feb. 22, 2018

Related U.S. Application Data

(60) Provisional application No. 62/132,276, filed on Mar. 12, 2015.

(51) Int. Cl.
*G01N 25/00* (2006.01)
*G01K 1/00* (2006.01)
(Continued)

(52) U.S. Cl.
CPC ............. *G01N 25/56* (2013.01); *B64D 15/20* (2013.01); *B64D 43/00* (2013.01); *E01C 11/24* (2013.01); *G01W 1/00* (2013.01)

(58) Field of Classification Search
USPC .................................. 374/16, 208, 45, 163, 1
See application file for complete search history.

(56) References Cited

U.S. PATENT DOCUMENTS 3,057,198 A 10/1962 Crouchman
4,333,004 A 6/1982 Forgue et al.
(Continued)

FOREIGN PATENT DOCUMENTS

CA 2535885 A1 3/2005
CA 2450062 C 1/2011
(Continued)

*Primary Examiner* — Mirellys Jagan
(74) *Attorney, Agent, or Firm* — Norton Rose Fulbright Canada LLP; Alexandre Daoust

(57) ABSTRACT

Methods and systems are described herein which allow to determine an icing condition without requiring a wind speed measurement. The methods and systems use two sensing members both being exposed to conditions in an environment. The determination is made based on a capacity of the sensing members to react differently to the conditions to which they are exposed. The conditions can be environmental or controlled. The determination includes measuring a variable indicative of the thermal state of each individual sensing member, and processing the measured values to generate the signal indicative of icing condition. The icing condition can be instrumental or meteorological.

17 Claims, 10 Drawing Sheets

(51) Int. Cl.
*G01K 7/00* (2006.01)
*G01N 25/56* (2006.01)
*B64D 15/20* (2006.01)
*E01C 11/24* (2006.01)
*G01W 1/00* (2006.01)
*B64D 43/00* (2006.01)

(56) References Cited

U.S. PATENT DOCUMENTS

| | | |
|---|---|---|
| 4,980,673 A | 12/1990 | Kleven |
| 5,790,026 A | 8/1998 | Lardière, Jr. et al. |
| 6,092,925 A * | 7/2000 | Nojiri .................... F25D 21/02 374/16 |
| 7,487,673 B2 | 2/2009 | Ormel et al. |
| 7,674,036 B2 | 3/2010 | Severson |
| 2008/0257033 A1 | 10/2008 | Roberts |
| 2010/0149785 A1 | 6/2010 | Dubuc et al. |
| 2016/0176530 A1* | 6/2016 | Skjoedt ................ B64D 15/20 374/16 |

FOREIGN PATENT DOCUMENTS

| | | |
|---|---|---|
| EP | 2330035 A2 | 8/2011 |
| WO | 8809941 A1 | 12/1988 |
| WO | 0120369 A1 | 3/2001 |
| WO | 2010070273 A1 | 6/2010 |
| WO | 2013177695 A1 | 12/2013 |

* cited by examiner

SYSTEM AND METHOD FOR DETERMINING AN ICING CONDITION STATUS OF AN ENVIRONMENT

Published PCT application WO 2013/177695, by applicants, discloses an apparatus and method to automatically determine an icing condition status of an environment. This approach was dependent upon a measure of wind speed.

BACKGROUND

Summary

There is described herein a plurality of embodiments with which an icing condition can be determined using an automated system having two (or more) sensing members with associated sensors. The sensing members being exposed to conditions in an environment, at least one of which is maintained in an ice-free state, and for both of which a variable indicative of the thermal state is measured. And wherein the icing condition can be processed using the measured variables and without requiring an anemometer to measure wind speed.

In accordance with a first aspect, one of the sensing members is amenable to be in a known "ice free" state, and the other is exposed to ice accumulation. Indeed, the presence of ice accumulation can cause a difference in the thermal state reaction to conditions to which the sensing members are exposed (e.g. external atmospheric conditions and/or controlled conditions), which can be evidenced by the thermal variables measured by the sensors (e.g. sensing member temperature or amount of controlled heat generation to which the sensing members are exposed). Accordingly, a determination of the presence or absence of ice accumulation can be made by processing the signals. In a simple embodiment, the sensing members can be identical and exposed to identical conditions, in which case the processing can amount to a simple comparison of the sensed values, which can be made by simple non-integrated electronic components for instance, and a determination of absence of ice can be made if the sensed values match whereas a determination of a presence of ice can be made if the sensed values do not match. In more elaborate applications, the system can be calibrated to take into account differences in the sensing members or in the conditions to which they are exposed, and the processing can be performed by an integrated circuit with reference to calibration data stored in a memory, or by a microcontroller, for instance.

In accordance with another aspect, both sensing members are amenable to a known "free of ice" state. The second sensing member and the first sensing member have a different size and/or shape having previously been determined to result in a different thermal state reaction when exposed to environmental air having a wind speed, temperature and liquid water content. The icing condition, which can be a meteorological icing condition of the environment, can be determined by processing the measured values.

In accordance with one aspect, there is provided a method for determining an icing condition value using at least a first sensing member and a second sensing member both being exposed to conditions in an environment, the method comprising: while at least the second sensing member is in an ice-free state, measuring a test value of a variable indicative of the thermal state of the first sensing member; simultaneously to said measuring the test value, measuring a reference value of a variable indicative of the thermal state of the second sensing member; processing at least both the measured test value and the measured reference value to determine the icing condition value and generating a signal based on the icing condition value.

In accordance with one aspect, there is provided a method for determining an icing condition of a first sensing member using at least a second sensing member, both the first sensing member and the second sensing member being exposed to an environment and the second sensing member being in an ice-free state, the method comprising: measuring a test value of a variable indicative of a thermal state of the first sensing member; simultaneously to said measuring the test value, measuring a reference value of a variable indicative of a thermal state of the second sensing member in its ice-free state, the measured reference value being associated to an expected value which is expected to correspond to the measured test value in a scenario where the first sensing member would be ice-free; comparing the measured test value to the expected value; and determining the icing condition of the first sensing member based on said comparison.

In accordance with one aspect, there is provided a method for determining an icing condition value using at least a first sensing member and a second sensing member both being exposed to conditions in an environment and having different size and/or shape leading to different thermal state reaction when exposed to environmental air having a wind speed, temperature and liquid water content, the method comprising: while both the first sensing member and the second sensing member are in an ice-free state, measuring a test value of a variable indicative of the thermal state of the first sensing member; simultaneously to said measuring the test value, measuring a reference value of a variable indicative of the thermal state of the second sensing member, and measuring an environmental value of at least one of the wind speed, temperature and liquid water content; and processing at least the measured test value, the environmental value and the measured reference value to determine the icing condition value indicative of at least another one of wind speed, temperature and liquid water content, and generating a signal based on the icing condition value.

In accordance with another aspect, there is provided a system for determining an icing condition value, the system comprising: a first sensing member and a second sensing member, both the first sensing member and the second sensing member being exposable to conditions in an environment; a first sensor adapted to measure a test value of a variable indicative of a thermal state of the first sensing member; a second sensor adapted to measure a reference value of a variable indicative of a thermal state of the first sensing member; a processor configured and adapted to process at least both the measured test value and the measured reference value to determine the icing condition value and generate a signal based on the icing condition value.

In accordance with another aspect, there is provided a system for determining an icing condition, the system comprising: a first sensing member and a second sensing member, both the first sensing member and the second sensing member being exposable to an environment and the second sensing member being amenable to a known ice-free state; a first sensor adapted to measure a test value of a variable indicative of a thermal state of the first sensing member; a second sensor adapted to measure a reference value of a variable indicative of a thermal state of the second sensing member, the measured reference value being associated to an expected value which is expected to correspond to the measured test value in a scenario where both the first sensing member and the second sensing member would be ice-free; and a processor capable of reading inputs of both the first sensor and the second sensor comparing the measured test value to the expected value; and determining the icing condition of the first sensing member based on said comparison.

In accordance with another aspect, there is provided a system for determining an icing condition, the system comprising: a first sensing member and a second sensing member both being exposable to conditions in an environment and both being amenable to a known ice-free state; the second sensing member and the first sensing member having a different size and/or shape resulting in a different thermal state reaction when exposed one of wind speed, temperature and liquid water content of the air in the environment; a first sensor adapted to measure a test value of a variable indicative of the thermal state of the first sensing member; a second sensor adapted to measure a reference value of a variable indicative of the thermal state of the second sensing member; a third sensor adapted to measure an environmental value of at least one of the wind speed, the temperature and the liquid water content of the air in the environment; a processor configured and adapted to receive the test value, reference value and environmental value simultaneously measured by the first sensor, second sensor and third sensor, and calculating at least an other environmental value of wind speed, temperature and liquid water content of the air, and generating a signal indicative of a meteorological icing condition based on said calculating.

In accordance with another aspect, there is provided an icing condition sensor having a cylindrical body with a plurality of sensing members made of a thermally conductive material and each being circumferentially interspersed with a plurality of insulating members each made of a thermally insulating material and thermally insulating adjacent ones of the sensing members from one another, and a plurality of temperature sensors, each one of said temperature sensors being associated to a corresponding one of the sensing members and connectable to an external data receiving device.

In accordance with another aspect, there is provided an icing condition sensor having a body of thermally conductive material surrounding an electrical power line conductor, the body having an external surface exposed to the environmental atmosphere, and a temperature sensor mounted to the body to measure a temperature of the external surface.

In accordance with another aspect, there is provided an icing condition sensor having a body made of a thermally conductive material and having an external surface exposable to the environmental atmosphere, a base covered by the body and made of a thermally insulating material, a heat generator operable to generate a controlled amount of heat, the heat generator being positioned between an internal surface of the body and the base, and a temperature sensor mounted to the body to measure a temperature of the external surface.

In this specification, the expression icing condition is used liberally in a manner to encompass a presence or absence of an ice accumulation, a duration of an icing event, an intensity of an icing event, a quantitative characterization of an ice accumulation (thickness, orientation, type of ice, density, etc.), a quantitative indication of a likelihood of icing, a quantitative determination of liquid water content (LWC) in environmental air, a wind speed of environmental air, etc. The specific expression instrumental icing condition is used to refer more specifically to the topic of ice accumulation on an instrument or other solid in an environment. The expression meteorological icing condition is used in association with meteorological conditions present in an environment, typically including a non-zero liquid water content (LWC) present in the environmental air, which can lead to ice accumulation on solids exposed to that environment. The expressions atmospheric icing condition and icing condition are used herein in a manner to encompass both meteorological icing conditions and instrumental icing conditions, and it will be understood that meteorological icing conditions can precede and overlap instrumental icing conditions. Moreover, it will be understood that the expressions first and second are used herein in reference to the sensing members for simplicity, in order to allow differentiation and later reference thereto, and that the expressions first and second as used herein are not intended to imply any specific structure or relative location of the associated sensing member. Similarly, the expressions test and reference used in relation with the word value are used only for differentiation and ease of later reference between the two values, as the expressions first and second could alternately be used, and are not intended to imply any specific limitation.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
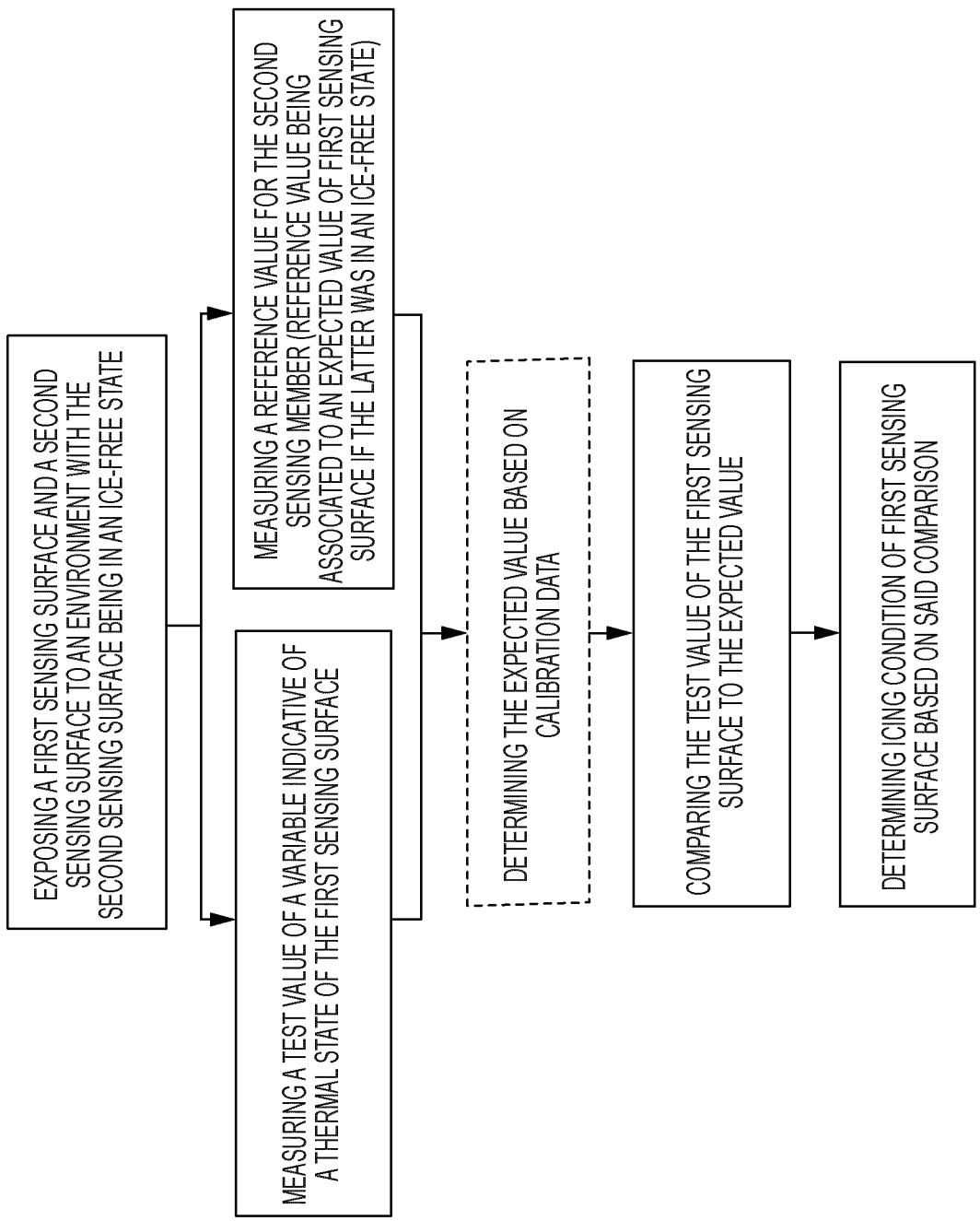
FIG. 1 is a flow chart of an example of a method of determining an icing condition.

FIG. 1 shows a first example method which can be used to determine an icing condition without requiring a wind speed measurement. This method can determine an instrumental icing condition of a sensing member using at least another sensing member. Both the first sensing member and the second sensing member are exposed to the same environmental conditions (e.g. sun, temperature, wind), or calibrated as a function of an expected difference in the environmental conditions, to the exception that while the first sensing member can accumulate ice, the second sensing member can be brought into or purposely maintained in an ice-free state. For ease of reference, the sensing member of which the instrumental icing condition is to be determined or characterized can be referred to as the test sensing member, or the first sensing member, whereas the one which is in the ice-free state during the measurement can be referred to as the reference sensing member, or the second sensing member. As will be described below, the sensing members can take various shapes and forms in various embodiments and the ice-free state of the second sensing member can be achieved by any suitable means. Examples of means to ensure that the second sensing member is in an ice-free state during method include using heat to melt the ice, protecting the sensor from ice by mechanical means (e.g. a hood), etc.

The method of FIG. 1 can be said to detect a thermodynamic effect that ice present on the test sensing member can have on the thermal state of that sensing member, based on a comparison, direct or indirect, with the thermal state of the reference sensing member which is known to be free of ice.

Indeed, the presence of an ice accumulation can have a thermally insulating effect on the sensing member, for instance, such that if two identical sensing members are used, and both are heated or refrigerated with a same amount of energy, the sensing members which would reach a same state of equilibrium with the environment if both free of ice can reach a slightly different state of equilibrium with the environment if one has ice on it and the other does not. It will be noted here that using identical sensing members in the same conditions apart from the presence of ice will lead to expect the temperatures of both sensing members to be the same in the absence of icing, whereas the temperatures can be slightly different if one has an ice accumulation and the other one does not. This scenario will be referred to herein as one where the reference value (here the temperature of the second sensing member) is equal to an expected value of the first sensing member if the first sensing member would be in an ice-free state. In this scenario, a difference between the temperatures of the two sensing members, in the context where the second is known to be ice-free, can be indicative of the presence of ice on the first.

A scenario where the two sensing members are not identical (such as being different is size, shape and/or configuration for instance) or are not provided an equal amount or thermal power, can be slightly more complicated to compare, as the reference value will still be associated to, but not necessarily directly equal to, the expected value of the first sensing member if the first sensing member would be in an ice-free state. Such differences can be remedied, to a certain extent, by characterizing the association via calibration. The calibration can be done by computer simulation, or on the basis of testing/empirical data. The calibration can provide calibration data in the form of a lookup table correlating values of one sensing member with the other, or in the form of a mathematical equation which can be used during processing. The calibration data can be used to convert measured values of embodiments having differences in the sensing members or in the conditions to which the sensing members are exposed into corresponding, easier to compare values, corresponding to embodiments in which the sensing members would be identical or subjected to the same conditions. The calibration data can be stored in a memory of a computer, or otherwise made accessible for processing, for instance, during which calibration data can be accessed to determine the expected value using both the measured reference value and the calibration data.

In embodiments where thermal power is provided to the sensing members in a manner to affect the sensing member temperatures, it can take a given amount of time for the temperature of the sensing members to stabilize (reach thermal equilibrium) even when the provided thermal power is maintained constant. In some embodiments, it is preferred to make the measurements once the sensing members are deemed to have reached thermal equilibrium relative to the supplied thermal power.

It will be noted here that even if the sensing members are not heated, the presence of ice can have an effect on the thermal state of the test sensing member. Indeed, sublimation of ice on a thermally conductive sensing member, for instance, can lead to bringing the sensing member to a slightly different temperature than the environmental temperature which is detected by the reference sensing member, and thus allow to determine the presence or absence of ice without even providing a controlled source of thermal power to the sensing members.

In a more evolved version of the method, the method can go further and use data concerning the dynamic thermal response of the sensing members to a thermal change in order to further characterize the ice accumulation and obtain information such as intensity of an icing event, amount of ice, orientation of ice, type or density of ice, etc. The variation of the thermal state can either stem from a variation in the environmental conditions, or from a variation in the thermal power of controlled thermal power source (whether a heat source or refrigeration source, for instance). Typically, in such cases, a plurality of measurements of the test value and the reference value will be made over a period of time during which the thermal state varies, and these measurements will be stored into a memory for later processing.

It will be noted here that the variables used in the comparison are indicative of a thermal state, but do not necessarily need to be the actual temperature of the sensing member. For instance, if heating the two sensing members, rather than providing an equal amount of thermal power and measuring the temperature response, it is possible to control the heat sources as a function of a target temperature. In this latter scenario, a difference between the expected heating power value required to reach a given temperature on the first sensing member and the actual heating power value to reach this temperature can be interpreted as an indication of a presence of icing. Accordingly, the variable indicative of a thermal state of the corresponding sensing member can be temperature of the sensing member, thermal power required to reach a target temperature, or, if, say, the surface area of the sensing member which is exposed to the wind can be adjusted, the value of the exposed sensing member area can be used as the variable indicative of a thermal state of the corresponding sensing member, to name a few examples. In scenarios where one, or both of the sensing members are heated, care can be taken to maintain the test sensing member below 0° C. to avoid affecting the ice accumulation.

In many cases, in order to be representative, the measurements on which the comparison is based should be simultaneous. The expression simultaneous here is not expressed in a strict mathematical sense, but rather as being taken sufficiently close to one another in time so as to make feasible the assumption that the environmental conditions have not significantly changed between the compared measurements.

In the method shown in FIG. 1, a presence of icing can be determined upon the comparison yielding a measured test value different from the expected value, whereas an absence of icing can be determined upon said comparison yielding a measured test value being equal to the expected value, for instance. A time elapsed from a determination of a presence of icing until the icing condition changes to an absence of icing can be monitored in order to determine a persistence of icing, for instance.

Example 1

Figures 2, 2A:
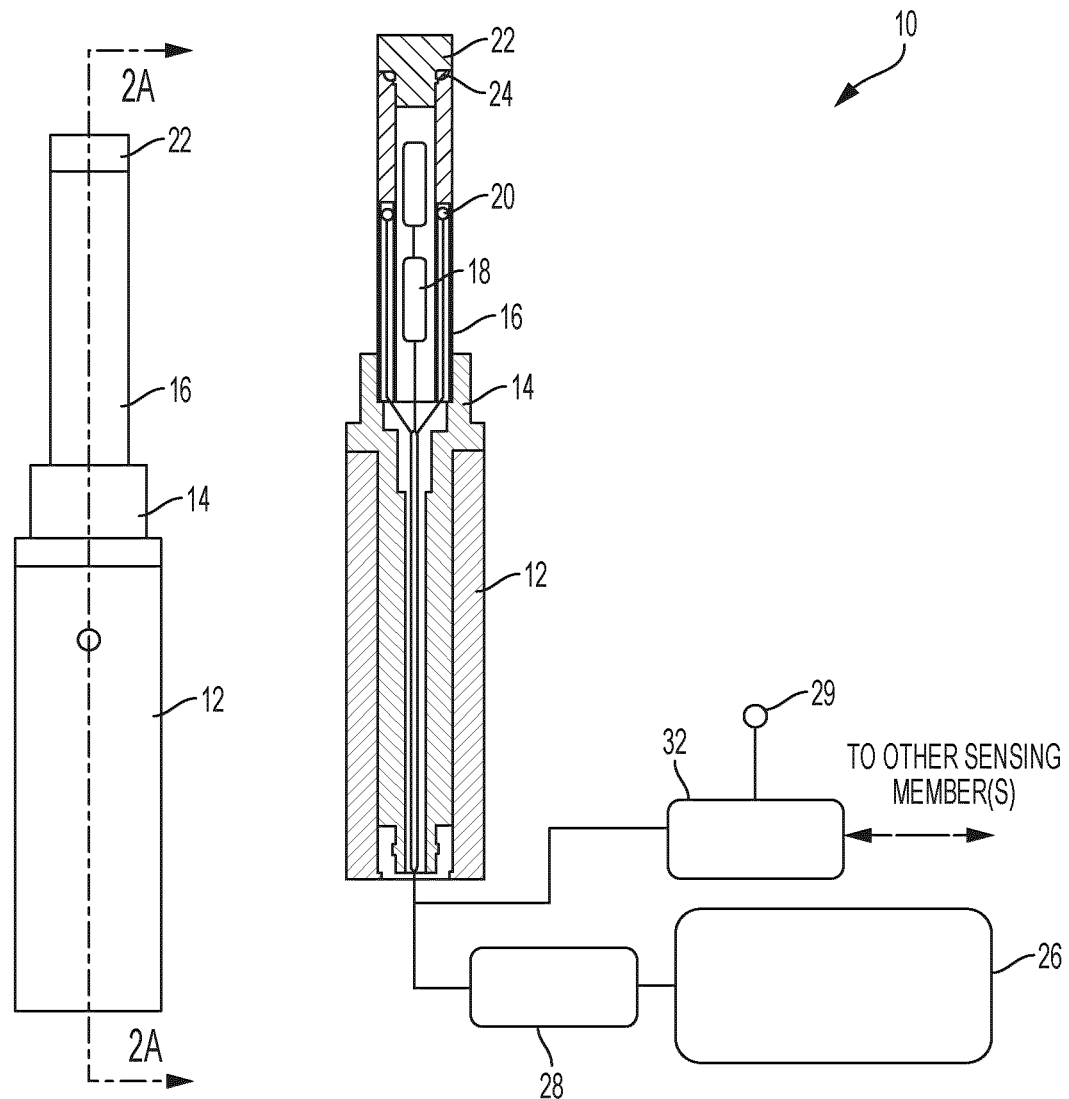
FIG. 2 is a side elevation view of an example probe which can be used to perform the method shown in FIG. 1.
FIG. 2A shows a system which can be used to perform the method shown in FIG. 1, including a probe shown as a cross-sectional view taken from FIG. 2.

Referring to the embodiment shown in FIG. 2A, two separate measurements of temperature are made. These measurements are taken by two separate probes having sensing members, where the sensing member of one of the probes is maintained free of ice (referred to herein as probe no1) either by thermal, mechanical or other means, while the other (referred to herein as probe no2) is allowed to accumulated ice. Let's denote U the flow velocity and $T_\infty$ the flow temperature to which both probes are exposed (which will be alternately referred to as the ambient temperature herein below).

In this embodiment, both probes are identical and exposed to the same environment. Both probes have a heating element and means are provided to obtain an indication of the amount of energy provided to the probe surface. Temperature sensors are disposed to obtain the surface temperature (Ts1, Ts2) of the probes. Accordingly, in the absence of icing conditions, it is expected that both probes will show similar surface temperature evolution when they are heated with the same amount of heat. An additional temperature sensor is also used to obtain the ambient temperature ($T_\infty$) of the environment in this embodiment, though it will be understood that this additional temperature sensor is entirely optional here. A computer can be provided to receive the inputs and can have access to lookup tables (stored in a local memory or accessible via the Internet for instance).

Looking at each probe individually, based on the first law of thermodynamic (law of conservation of energy), the amount of energy that comes into the system ($q_{in}$) must be equal to the amount of energy the comes out of the system ($q_{out}$) summed with the amount of energy that is store into the system ($q_{storage}$) as depicted in equation 1.

$$q_{in}=q_{out}+q_{storage} \quad (\text{eq. 1})$$

The amount of energy that is stored into the probe can be written using equation 2, where m is the mass of the probe and $c_p$ is the specific heat of the probe.

$$q_{storage}=mc_p(T_s-T_\infty) \quad (\text{eq. 2})$$

The amount of energy that is fed into the system, can be determined, and can be written using equation 3 when other energy sources than the heat source can be neglected.

$$q_{in}=q_{heat\ source} \quad (\text{eq. 3})$$

As will be shown below, it is possible to use a probe which is exposed to the environment via the surface of a portion made of thermally conductive material, and configured in a manner as radiation and conduction losses can be neglected. Accordingly, taking only energy losses by convection into consideration, the amount of energy extracted from the system can be written as equation 4 where A is the exposed area of the probe and h is the average convection coefficient.

$$q_{out}=q_{conv}=hA(T_s-T_\infty)\Delta t \quad (\text{eq. 4})$$

Rearranging equation 1 using equations 2 to 4, leads to equation 5.

$$q_{heat\ source}=hA(T_s-T_\infty)\Delta t+mc_p(T_s-T_\infty) \quad (\text{eq. 5})$$

As will be shown below, it is possible to use a probe configured in a manner that the average convection coefficient (h) is directly dependent on the flow velocity (U) as follows:

$$h=g(U) \quad (\text{eq. 6})$$

and $$q_{heat\ source}=g(U)A(T_s-T_\infty)\Delta t+mc_p(T_s-T_\infty) \quad (\text{eq. 7})$$

Therefore, the surface temperature of probe no1, which is always maintained free of ice in this embodiment, can be considered as a function of the features of the probe (Pfea), flow velocity (U), flow temperature ($T_\infty$) and the amount of heat from the source ($q_{heat\ source}$) as presented in equation 8.

$$T_s(t)=f(Pfea,U,T_\infty,q_{heat\ source}) \quad (\text{eq. 8})$$

When ice has built up on the surface of the probe, other thermal mechanisms can contribute to extract energy from the sensor, such as sublimation of ice, conduction through the layer of ice, etc. These other thermal mechanisms can have a direct effect of the static and dynamic thermal behaviour of the probe. Accordingly, while equation 8 can be used for probe no. 1 which is kept free of ice, equation 9, presented below, can be used for probe no. 2 which is allowed to accumulate ice, where additional other parameters of interest corresponding to the features of the accumulated ice (Ifea) are taken into consideration:

$$T_{s\_ice}(t)=f(Pfea,Ifea,U,T_\infty,q_{heat\ source}) \quad (\text{eq. 9})$$

Such additional parameters can include the mass of ice (Mice) accumulated on the probe, the thickness of ice (Tice), density of ice (Idens), the specific heat of ice (cp_ice), and/or the liquid water content (LWC), for instance.

Accordingly, if two identical probes are used, and the two identical probes are both known to be free of ice, exposed to the same environment (U, $T_\infty$), and exposed to the same heat source conditions ($q_{heat\ source}$), both probes should reach a steady state of heat transfer from the heat source to the environment in which the surface temperature $T_s$ is equal. Accordingly, upon varying the heat source conditions simultaneously on both probes, the surface temperatures of both probes should remain equal as they vary. Similarly, if the heat source condition varies, the surface temperatures of both probes should vary in the same manner, or if the surface temperature is kept constant by adjusting the heat sources, the same amount of heat is required to keep both surfaces at the same temperature.

Let us now consider an alternate scenario where two identical probes are exposed to the same environment (U, $T_\infty$), and exposed to the same heat source conditions ($q_{heat\ source}$), but only one of the two identical probes is known to be free of ice. In this scenario, if the temperature equilibrium of the surface temperatures is not the same, if, upon modifying the intensity of the heat source, the variation of the surface temperatures is not simultaneous, or if the required intensity of the heat source to achieve a given surface temperature is not the same, one can deduct that the presence of ice on the second one of the probes is interfering with the heat transfer equilibrium of that probe, and thus infer the presence of ice on the second one of the probes even if the speed of wind (U) is unknown, given that this variable can be factored out of the system of two equations formed by the two probes and the only unknown is Ifea, that is the effect of the ice accumulation on the heat transfer characteristics of the probe.

An intelligent inference system such as an expert system can be used to send different heating signals (e.g. step, sinusoidal, impulse) and analyse the thermal behaviour (e.g. temporal evolution of the surface temperature, attenuation or amplification of the surface temperature fluctuations) of the probes in order to determine the meteorological conditions. The detailed analysis of the thermal behaviour, combined with experimental data, can lead to the characterization of parameters of interest such as the thickness of ice, type of ice, and/or mass of ice on the probe, for instance.

Therefore, in the simplest case of two identical (probe no1 and probe no2 referred to above), it is possible to detect the presence of ice using the comparison between the temperature variation in a case where the dissipated heat is identical, or, if the temperature is controlled to be constant, by comparing the required amount of heating power provided to the probes to maintain the temperature constant. It will be noted here that simple cases are presented above for simplicity and clarity of explanation and that more complex equations can factor in more variables to account for more complex scenarios as will be understood by persons of ordinary skill in the art.

In this embodiment, the energy source is electrical and energy rate (power) is monitored. The heating element is a resistor through which a current flows, thus heating the probe through Joule effect, and can thus be represented by eq. 10, below, based on Joule's first law and where C is a constant between 0 and 1 which is associated to a controlled amount of energy fed into the system. As will be expressed below, the energy fed into the system can be varied during the method, such as with pulse width modulation for instance.

$$q_{in} = q_{heat\ source} = C \frac{V^2}{R} \Delta t \qquad (eq.\ 10)$$

Alternately, current can be controlled to regulate the amount of energy fed into the system.

In this embodiment, the processor is connected to other systems so that it can either upload or download information about the meteorological conditions and take action upon them.

In this embodiment, a controller, which can be provided as part of the computer or in the form of a separate device, controls the amount of energy dissipated in both probes. In an embodiment, a pulse width modulation (PWM) system can be used. The processor controls the duty cycle of the PWM to control the amount of energy fed into the system.

In a specific example, the probe shown in FIG. 2A can be used in obtaining the data required to perform the method. The probe has a support strut 12, a base 14 which is made of a thermally insulating material (low thermal conduction), a sensing member 16 which is exposed to the environment and made in this example of a thermally conductive material such as a metal for instance (a hollow aluminum cylinder is used in this specific embodiment), an internal heating element 18 which can deliver heat to the sensing member 16, a temperature sensor 20 to determine the temperature of the sensing member 16, and a probe tip 22 made of a thermally insulating material. As will be understood, the probe tip 22 and the probe base 14, by their thermally insulating nature, directs the heat generated by the heating element 18 to the sensing member 16. An O-ring is used as a seal between the tip 22 and the sensing member 16. A power source 26 is used to power the heating element 18 and in this embodiment, a power meter 28 is used to quantify the amount of power delivered to the heating elements 18 by the power source 26. An optional temperature sensor 29 to sense the temperature of the environment is also used. In this embodiment, the probe is axisymmetric thus providing omnidirectional sensitivity.

It will be noted that in the embodiment presented above, the features of the probe Pfea include sensing member diameter (D), sensing member length exposed to the flow (L), mass of the probe (m), specific heat of the probe ($c_p$).

It will be noted here that using a relatively high ratio between the thermal conductivity of the thermally conductive material used in the sensing portion of the probe and the thermally insulating material used at the tip and bottom, and using a relatively simple geometrical shape for the sensing members, is not essential, but can help in factoring out losses by conduction through the tip and base and can thus help in keeping the mathematical model relatively simple. Alternately, the probe can have a different structure and its thermal conductivity can be characterized by finite element modeling or empirically, for instance. In a preferred embodiment, aluminum can be used as the thermally conductive material, and an acetal homopolymer resin can be used as a thermally insulating material, as both these materials are highly resistant to the environmental conditions, and the thermal conductivity of aluminum is more than 100 times higher than the thermal conductivity of acetal homopolymer resin. In alternate embodiments, other materials can be used, and it will be understood that the use of a thermally insulating material is optional.

The probe can have one or more heating elements embedded therein, and one or more temperature sensors are disposed in a manner to measure the surface temperature ($T_s$). An energy source is connected with the heating element and an energy meter is used to measure the amount of energy generated at the center of the probe. A processor is used to gather information from the energy meter as well as from the different temperature sensors ($T_s$ and $T_\infty$). The processor can also act upon the energy source to control the amount of energy dissipated in the probe. This processor is also used to store lookup tables (or the like) to interpret the data gathered and provide useful information about the ongoing processes (i.e. meteorological conditions) that are taking place. This processor can be used to investigate the ongoing processes in order to determine the parameters and to keep track of historical measurements.

The system 10 in this embodiment also includes another identical probe (not shown) and a processor 32 (which will be referred to as a computer for convenience) used to gather information from the energy meter as well as from the different temperature sensors (Ts1, Ts2 and $T_\infty$).

The following table provides information about the probe and the different elements that characterize this embodiment.

TABLE 1

Characteristics of the probe.

| Characteristic | Value |
|---|---|
| Diameter (D) [mm] | 13.47 |
| Length of the sensing member | 50.9 |

TABLE 1-continued

Characteristics of the probe.

| Characteristic | Value |
| --- | --- |
| exposed (L) [mm] | |
| Area exposed (A = πLD) [mm$^2$] | 2154 |
| Electric tension [V] | 24.16 |
| Heating element resistance [Ω] | 112 |
| Maximal energy rate (q$_{joule}$) [W] | 5.2 |

Experimental results were obtained for three specific test scenarios using a same test setup and are now presented. In the test setup, two identical probes were used (probe 1 (with ice) and probe 2 (without ice) using the reference presented above), both were exposed to the same environment, and ice was formed artificially on probe 2.

Test Scenario 1

In test scenario 1, neither one of the probes are heated. Accordingly, q$_{heat\ source}$ is 0.

Figure 3:
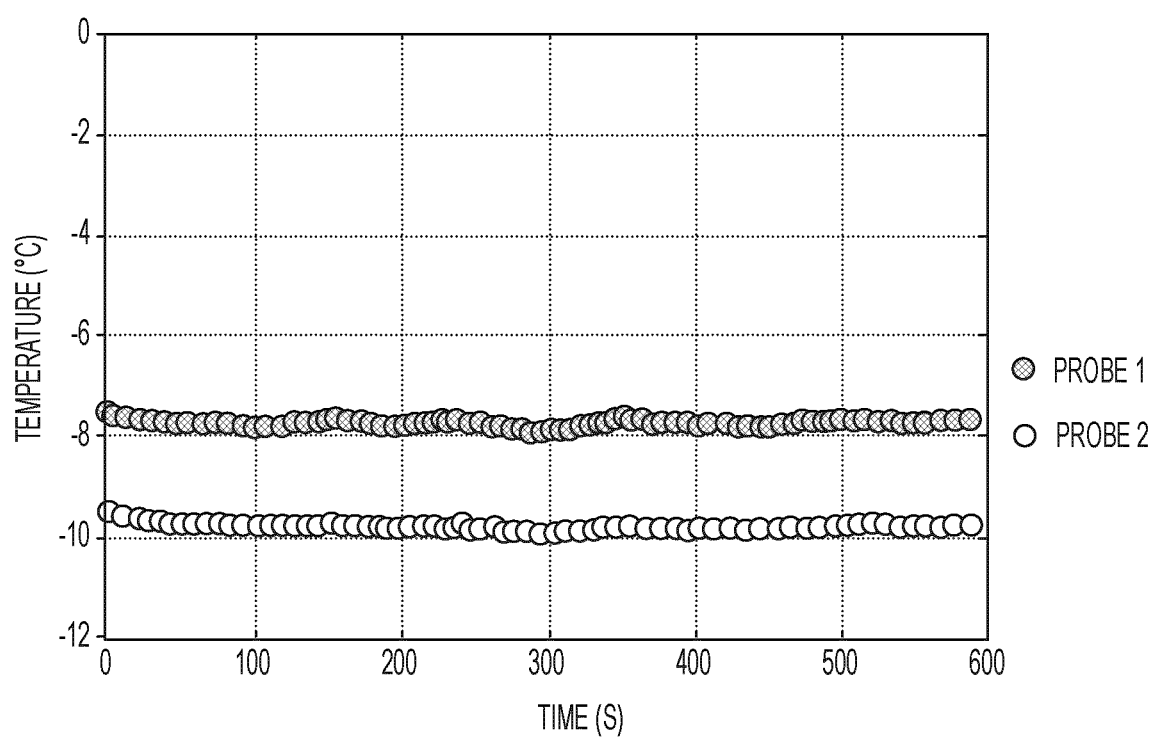
FIG. 3 is a graph showing temperature vs. time for a first test scenario using the system shown in FIG. 2A.

In the graph presented in FIG. 3, the temperature reading of the two probes is plotted against time. As shown in this graph, the temperature reading of the probe which has ice on it is significantly lower than the temperature reading of the probe which is without ice. Accordingly, a determination of a presence of ice accumulation can be made with respect to probe 1.

Test Scenario 2

In test scenario 2, both probes are heated with the same heating power (1 W each). The heating power is sufficiently high to significantly affect the temperature of the probe, while being sufficiently low to avoid bringing the temperature of the probes (especially probe 1) above 0°, to avoid affecting the ice accumulation.

Figure 4:
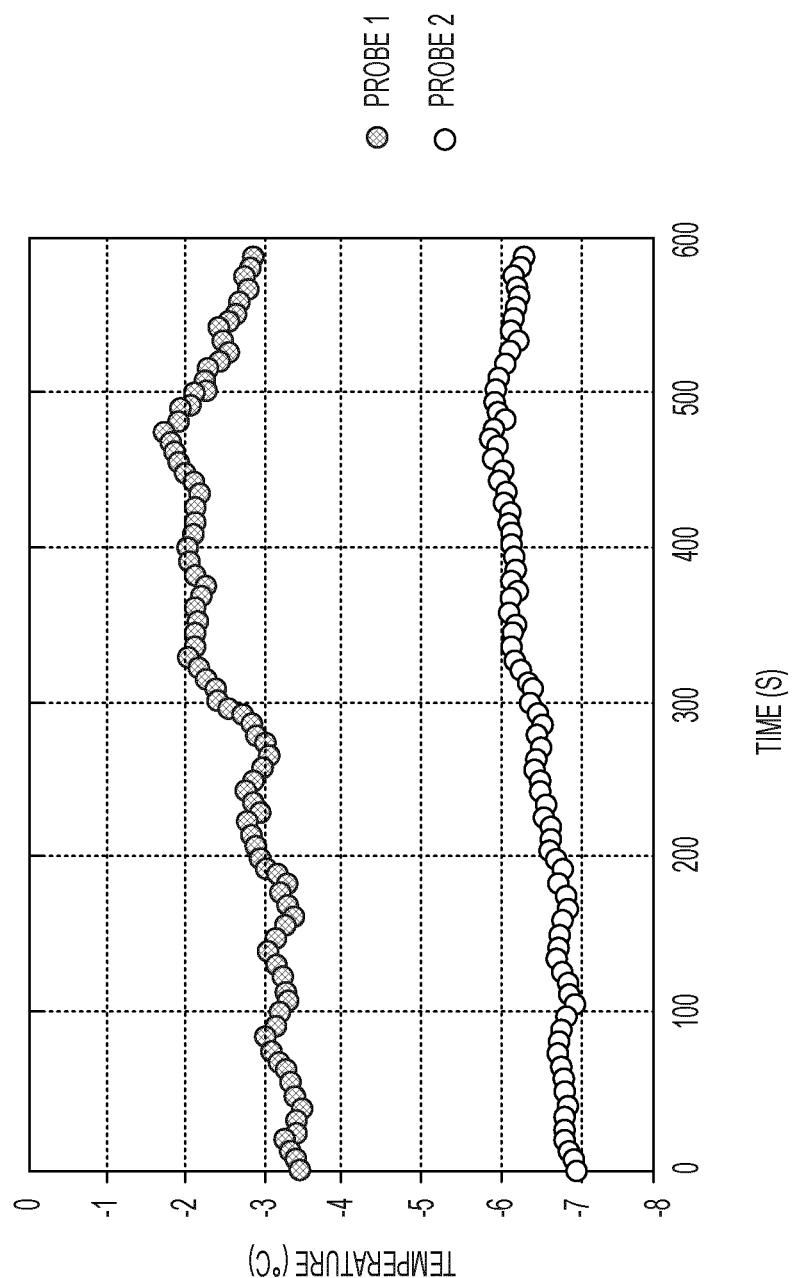
FIG. 4 is a graph showing temperature vs. time for a second test scenario using the system shown in FIG. 2A.

The graph presented in FIG. 4, is plotted in the same manner as the graph presented in FIG. 3. It can be seen that in this second test scenario as well, the temperature reading of probe 1 is significantly affected by the presence of the ice accumulation.

Test Scenario 3

In test scenario 3, both probes were subjected to an increase of power from 0 W to 1 W and then to a decrease of power from 1 W to 0 W, in order to allow plotting the dynamic response of the probes to the power and changing environmental conditions. In this embodiment, the power was stepped up and stepped down instantaneously within practical limitations. However, it will be understood that in alternate embodiments, the increase and decrease in power can take the form of a progressive ramping, sinusoidal variation, or any suitable variation.

Figure 5:
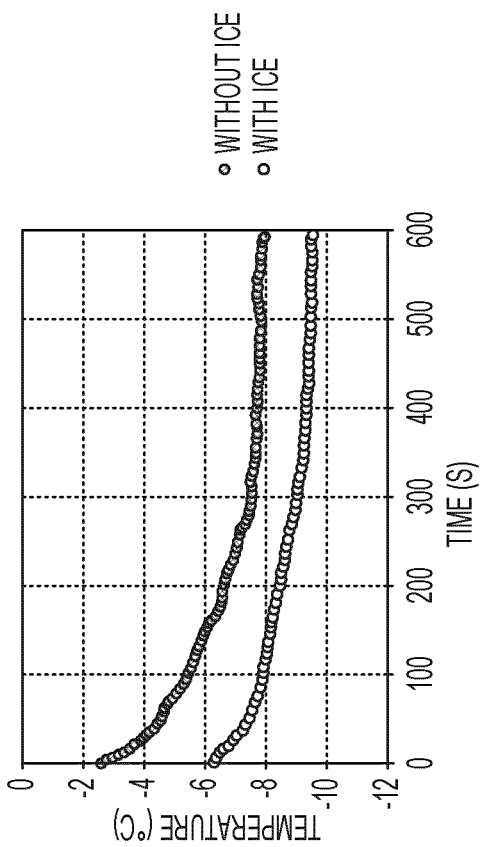
FIGS. 5 to 8 are graphs showing temperature vs. time for a third test scenario using the system shown in FIG. 2A.
Figure 6:
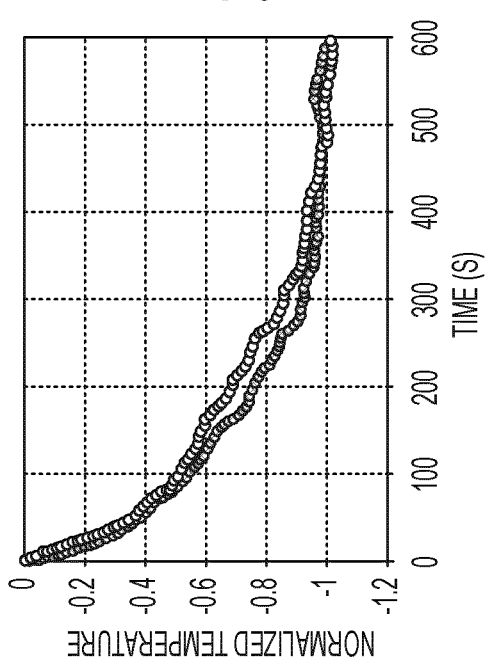
Figure 7:
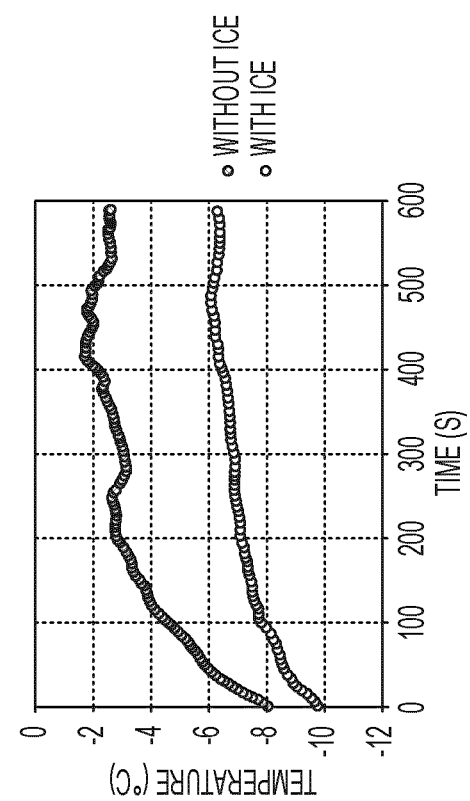
Figure 8:
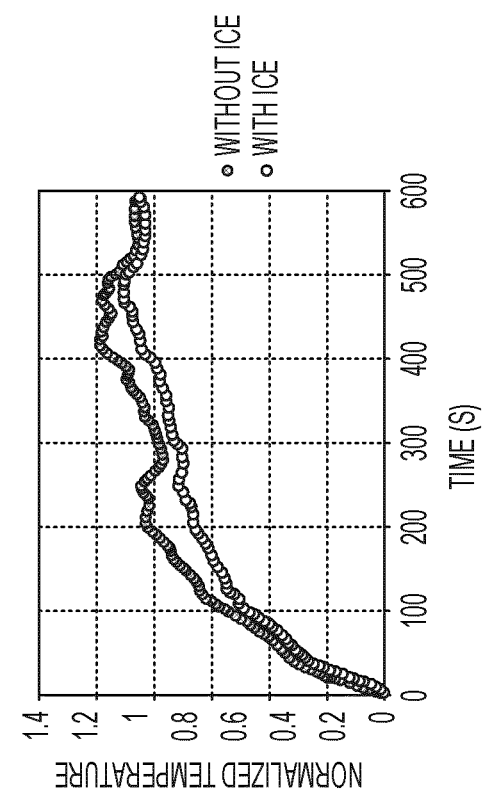

The raw data of this test scenario is plotted in FIGS. 5 (increase) and 6 (decrease) while FIGS. 7 and 8 show corresponding normalized graphs allowing to more easily compare the shape of the plots.

In such scenarios where the power is varied, the difference between time responses of both probes can be used to characterize features of the accumulated ice (Ifea).

In the examples provided above, two identical probes are used to perform the method though it will be understood that two different probes can be used in alternate embodiments. In alternate embodiments none of the probes can be heated, only one of the probes can be heated, or both probes can be heated with separate heating devices or using a same heating device, to name a few examples. Published PCT application WO 2013/177695 shows an alternate embodiment of a probe which can be used.

In another embodiment, only one probe, having more than one sensing member, is used rather than two. In this embodiment intelligent investigation of the conditions using static or dynamic thermal behaviour of the different sensor is used to zero in on the actual icing condition.

Figures 9, 9A:
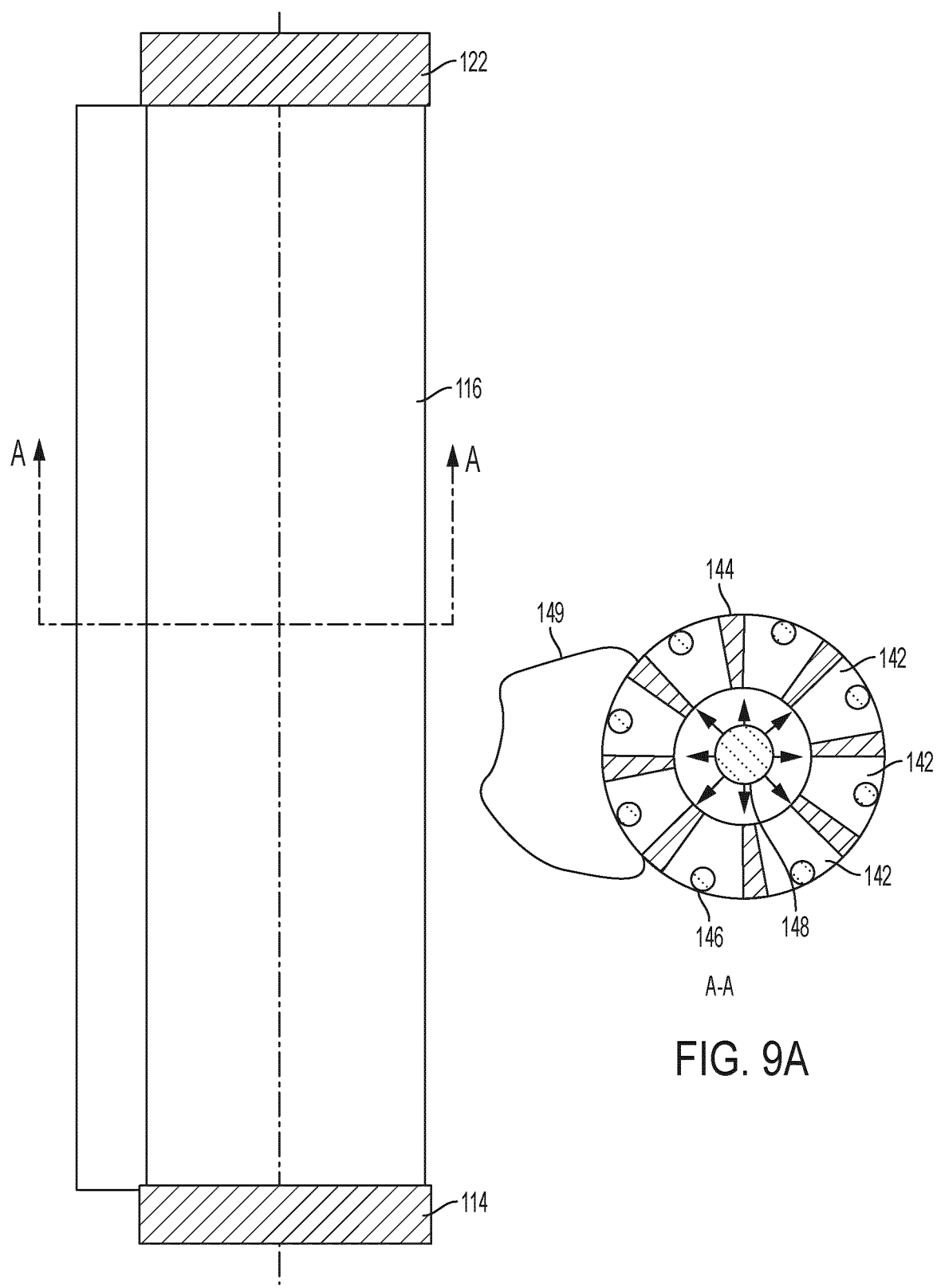
FIG. 9 is another example of a probe which can be used to perform the method shown in FIG. 1, in which a plurality of sensing members are part of a same device.
FIG. 9A is a cross-sectional view taken along lines A-A of FIG. 9.

FIG. 9 shows an example of a probe which can be used to determine or characterize an icing condition in a single-probe embodiment. As seen externally, the general construction appears similar to the construction described above with reference to FIG. 2, with the probe having a generally cylindrical portion 116 terminated at both ends by an insulating bushing 122, 114 made of thermally insulating material. As shown in the cross-section view of FIG. 9A however, it can be seen that in this example, though the probe is axisymmetric, it is has a plurality of sensing members 142 made of thermally conductive material that are segmented/isolated from one another by partitions 144 which are made of a thermally insulating material. Each section has a corresponding sensing member 142 and a corresponding temperature sensor 146. In this embodiment, all the sensing members 40 are heated collectively using a single, central heat source 118, which can be designed to share the heat equally to each of the sensing members. In this configuration, each section can be analysed independently and directionality of instrumental icing 149 can further be assessed.

Figure 10A:
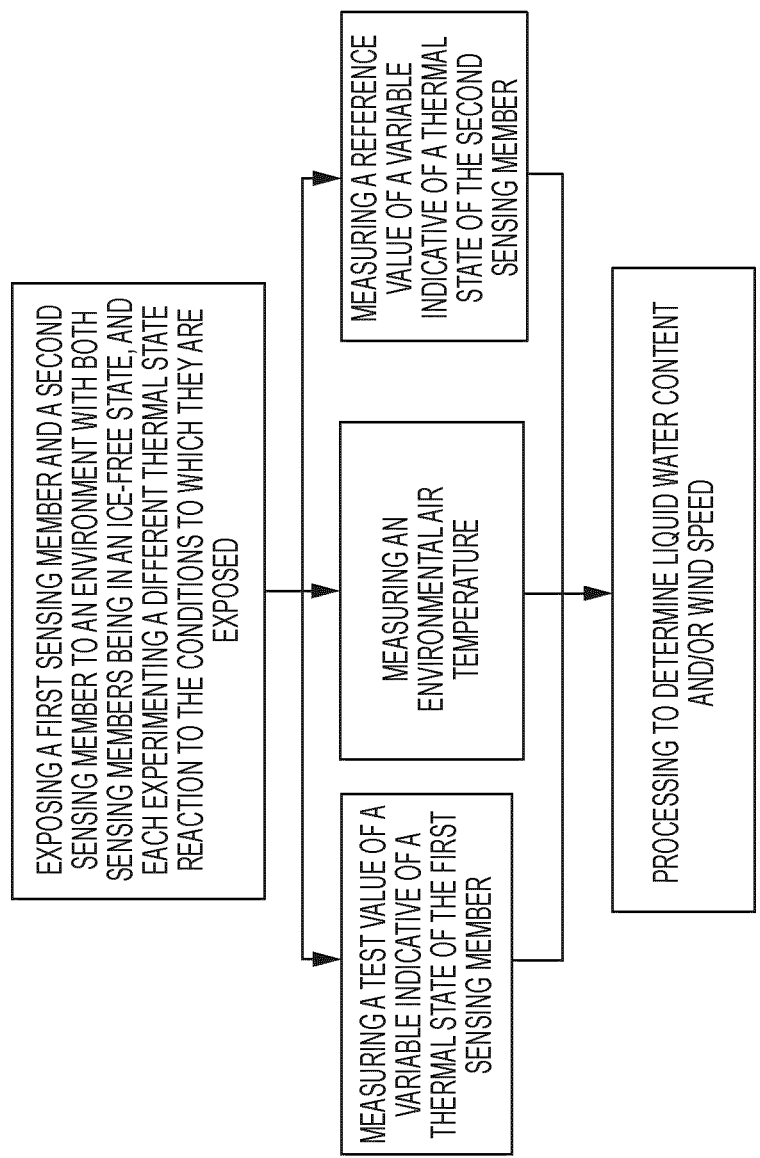
FIG. 10A is a flow chart of another example of a method of determining an icing condition.

FIG. 10A illustrates a second example method by which an icing condition can be determined using two sensing members, and without requiring a wind speed measurement. In this second example, both sensing members are exposed to the environment, but the sensing members are different, such as in size or shape, in a manner leading to different thermal state reactions when exposed to environmental air having a wind speed, temperature and liquid water content. A value of a variable indicative of a thermal state of each respective sensing member is measured. The differences in the thermal state reactions are evidenced in the measured values, and, based on predetermined configurations of the sensing members, and/or calibration, and the measurement of at least one of wind speed, temperature and liquid water content, the other ones of wind speed, temperature and liquid water content can be determined. In practice, it is environmental air temperature is typically readily measurable, whereas measuring wind speed or liquid water content can require more sophisticated instruments. Moreover, as presented in the mathematical equations below, using the environmental air temperature as the starting measurement can simplify the determination compared to using wind speed or liquid water content as the starting measurement. Accordingly, the method will typically be used to measure wind speed or liquid water content based on the measurements indicative of the thermal state of the sensing members and the measurement of the environmental air.

Figure 10B:
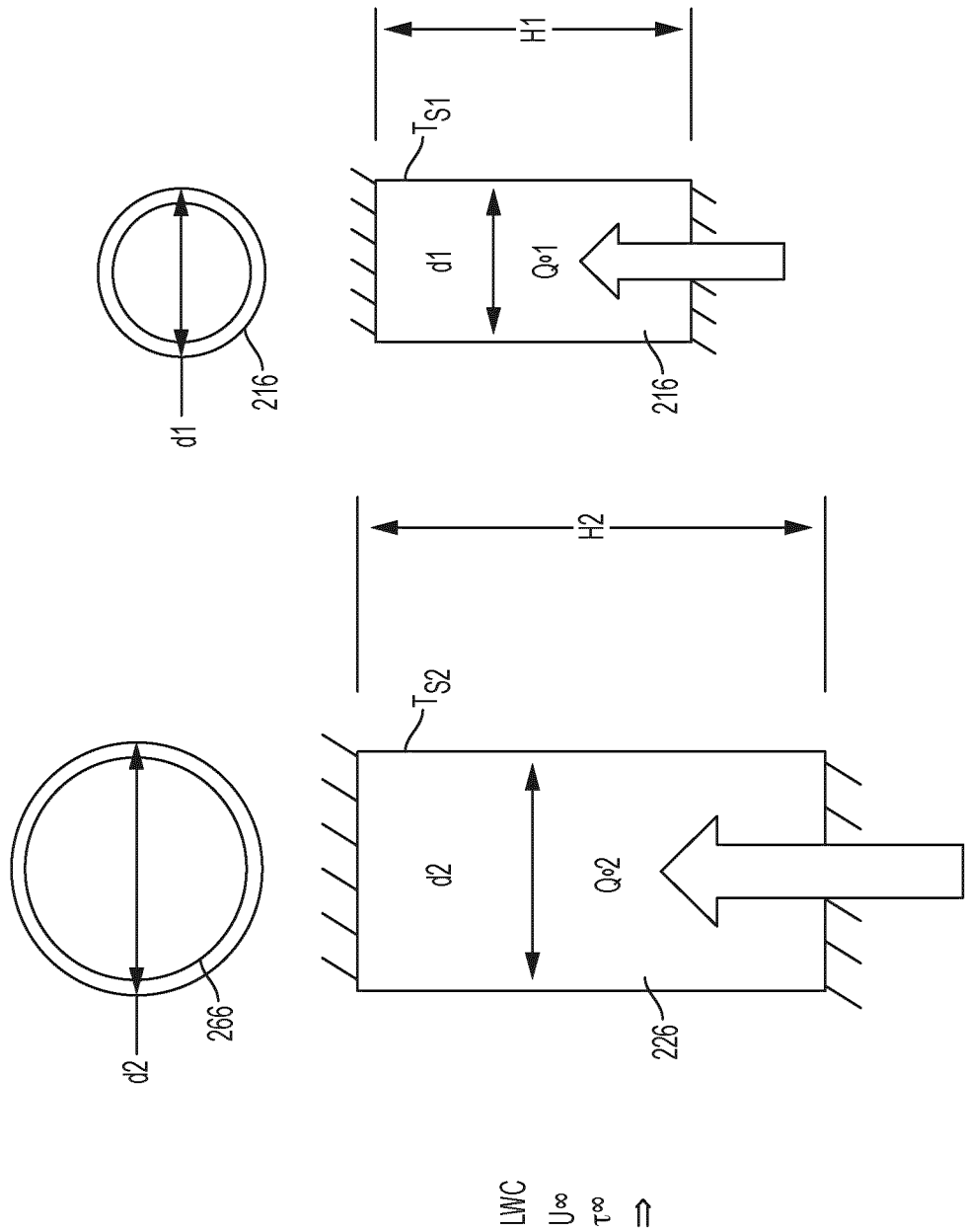
FIG. 10B is a simplified schematic view showing two cylindrical sensing members having different diameters, such as can be used to perform the method of FIG. 10A.

In one relatively simplified embodiment, two cylindrical probes such as shown in FIGS. 2 and 2A can be used for the sensing members, with one of the sensing members 266 having a greater diameter d2 than the diameter d1 of the other 216, such as illustrated in the cross-sectional views shown in FIG. 10B. In FIG. 10B, the heights H1 and H2 are different, but it will be understood that the heights can alternately be the same.

Both the first sensing member 216 and the second sensing member 266 are exposed to environmental air having a speed $U_\infty$, a temperature $T_\infty$, and an unknown liquid water content LWC. The first sensing member 216 is heated at with a thermal power $Q_1^\circ$, and its temperature is measured $T_s^1$.

The amount of water per unit of time which engages the sensing member can be represented as $$M_1° = C_o \cdot \mathcal{LWC} \cdot H_1 \cdot d_1 \cdot U_\infty \qquad (eq. 11)$$

Where $C_o$ is a constant.

The surface area of the sensing member which is exposed to the flow can be represented as $$A_1 = \pi d_1 H_1 \qquad (eq. 12)$$

The Nusselt number is $$Nu_1 = \frac{h_1 d_1}{K} \qquad (eq. 13)$$

and follows a relation of the following type: $C_1 + C_2 \, Re_1^n$, where Re is the Reynolds number ($Re_1 = U_\infty d_1/v$ where v is the cinematic viscosity of the fluid), K is the thermal conductivity of the fluid, C1 and C2 are constants, and n is a constant approximately equal to 0.5 (the fluid is air).

Accordingly:

$$h_1 d_1 / K = C_1 + C_2 Re_1^n = Nu_1 \Rightarrow h_1 = K\frac{(C_1 + C_2 Re_1^n)}{d1} \qquad (eq. 14)$$

Modelizing the droplets of water which come into contact with the sensing member as being of the same temperature than the air and all being heated by the sensing member up to the sensing member's surface temperature, the following relationship can be obtained):

$$Q_1° M° C_p(T_{s1} - T_\infty) + h_1 A_1(T_{s1} - T_\infty) \qquad (eq. 15)$$

$$\Leftrightarrow Q_1° = C_o \mathcal{LWC} \, H_1 d_1 U_\infty C_p(T_{s1} - T_\infty) \qquad (eq. 16)$$
$$+ \frac{K(C_1 + C_2 U_\infty^n d_1^n V^{-n})\pi d_1 H_1(T_{s1} - T_\infty)}{d_1}$$

The same relationship can be obtained with respect to the second sensing member $$Q_2° = C_o \mathcal{LWC} \, H_2 d_2 U_\infty C_p(T_{s2} - T_\infty) + K(C_1 + C_2 U_\infty^n d_2^n V^{-n})\pi H_1(T_{s1} - T_\infty) \qquad (eq. 17)$$

By combining equations 16 and 17, the following equations can be obtained:

$$U_\infty = \qquad (eq. 18)$$

$$\frac{\left[\frac{Q_2° d_1}{H_2(T_{s2} - T_\infty)} - \frac{Q_1° d_2}{H_1(T_{s1} - T_\infty)} + KC_1\pi + C_2(d_2 - d_1)\right]^2}{KC_2 V^{-n}\pi(d_1 d_2^n - d_2 d_1^n)}$$

$$\mathcal{LWC} = \frac{\left[\frac{Q_1°}{H_1(T_{s1} - T_\infty)} - KC_1\pi + KC_2\pi + C_2 U_\infty^n d_1^n V^{-n}\pi\right]}{C_o d_1 U_\infty C_p} \qquad (eq. 19)$$

It will noted here that PCT application WO 2013/177695 demonstrates how to obtain LWC once $U_\infty$ is known.

$$\mathcal{LWC} = \frac{\left[\frac{Q_1°}{H_1(T_{s1} - T_\infty)} - KC_1\pi - KC_2\left\{\frac{Q_2° d_1}{H_2(T_{s2} - T_\infty)} - \frac{Q_1° d_2}{H_1(T_{s1} - T_\infty)} + KC_1\pi(d_2 - d_1)\right\}^{2n} d_1^n V^{-n}\pi\right]}{C_o d_1 C_p} \qquad (eq. 20)$$

$$\left\{\frac{\frac{Q_2° d_1}{H_2(T - T_\infty)} - \frac{Q_1° d_2}{H_1(T - T_\infty)} + KC_1\pi(d_2 - d_1)}{KC_2 V^{-n}\pi(d_1 d_2^n - d_2 d_1^n)}\right\}^2$$

Accordingly, by measuring $Q_1°$, $Q_2°$, $T_{s1}$, $T_{s2}$ and $T_\infty$, given that the other variables are previously known, the liquid water content (LWC) can be calculated.

The above mathematical demonstration shows that a known difference in diameter of two cylindrical sensing members can allow, based on their different thermal state reaction, measuring the liquid water content and wind speed of the environmental air. Persons skilled in the art, having access to nowaday's computer assisted finite element calculations, will understand that other differences in size or shape between the two cylindrical sensing members than differences in diameters of cylindrical sensing members can also be used as the basis of liquid water content and wind speed calculations, and make a suitable automated icing condition determination, in alternate embodiments. For instance, in an alternate embodiment, the sensing members can have streamlined profiles with different cord/thickness ratios instead of cylinders having different diameters.

The methods described above can be computer-implemented by a computer which receives the different inputs. In this embodiment, the computer can have a very basic processor and associated memory. Alternately, the computer can be a smartphone for instance, and the inputs be transmitted to the smartphone in a wired or wireless (e.g. Bluetooth™) manner, or the computer can be replaced by a suitable integrated or non-integrated electronic circuit. All these variations will be referred to herein as a processor for the sake of simplicity. This processor can also used to access calibration data in the form of lookup tables or mathematical formulaes (or the like) in the form of stored data to interpret the data gathered and provide useful information about the ongoing processes (i.e. icing conditions) that are occurring. This processor can also be used to investigate the ongoing processes in order to determine the parameters and to keep track of historical measurements. The signal which is generated by the processor based on the determined icing condition value is typically an electromagnetic signal conveyed in a wired or wireless manner and can be used in various ways. For instance, the signal can be used to trigger an audible or visual alarm, typically remotely, destined to an operator. Alternately, the signal can be used to trigger automatic activation or deactivation of an ice-mitigation system. Still alternately, the signal can simply be a data output which stores the processed values on a computer readable medium for later use. A software program product can be used to control the operation of the processor, or the processor can be hardcoded. A software program product can be used access the processed values on the computer readable medium and display the data on a graphical user interface.

Figure 11:
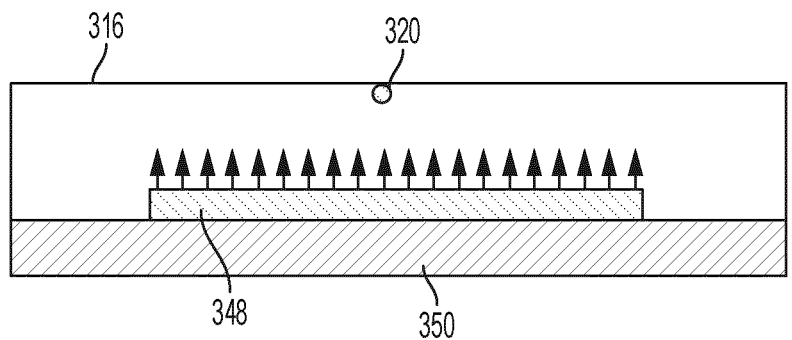
FIG. 11 is another example of a probe which can be used to perform the method shown in FIG. 1, where the probe is provided in the form of a section of asphalt.

It will be understood that the methods described above can be embodied with sensing members provided in alternate forms than the probes shown in FIGS. 2 and 2A. In another embodiment, the probe is not axisymmetric and could be of a generally flat shape or any alternate shape. A specific adaptation, shown in FIG. 11, can be used to determine the icing condition on a substrate such as a road. In such embodiment, the probe can include a sensing member 316 in the form of an asphalt section. The sensing member 316 can cover a base 350 which can be made of a thermally-insulating material to simplify the heat transfer calculations, and a heat or cooling source 348 can be provided between the sensing member 316 and the base 350. In this example, a temperature sensor 320 is provided close to the external surface of the sensing member 316.

Figure 12:
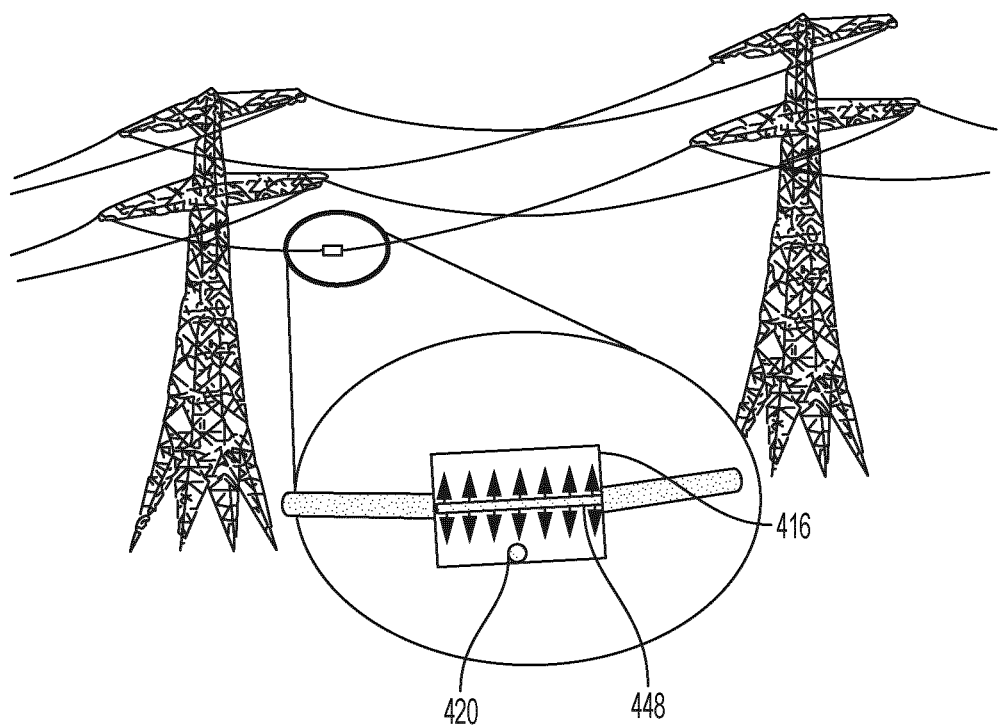
FIG. 12 is another example of a probe which can be used to perform the method shown in FIG. 1, where the probe is provided in the form of a cylinder encapsulating an electrical wire.

In yet another embodiment, the probe can be designed to fit on overhead electric cables to identify when icing is occurring on overhead electric lines. When ice accumulates on overhead electric lines, it adds mass to the cables and increases the stress on the supporting structures (e.g. pylons). Adequate measurement of the operating conditions of such infrastructure be used to trigger an alarm of a risk of reaching the critical load of the pylons, for instance. FIG. 12 presents an embodiment where the probe has a sensing member 416 in the form of a body wrapped around an electrical cable to this end, for instance. The current-carrying electric cable itself can act as a heat source 448, and a temperature sensor 420 can be provided to measure the temperature of the sensing member 416. The probe can be designed so as to fit on overhead electric cables so that it could identify when icing is occurring on overhead electric lines. Adequate measurement of the operating conditions of such infrastructure can prevent disaster like falling of pylons.

Figure 13:
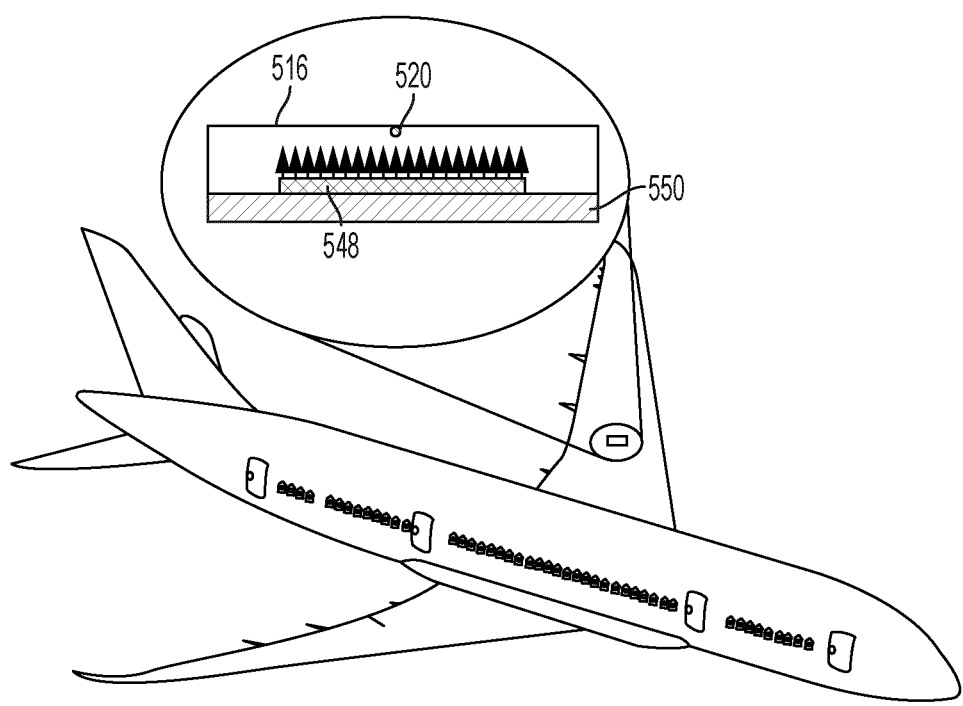
FIG. 13 is another example of a probe which can be used to perform the method shown in FIG. 1, where the probe is provided in the form of a portion of a fuselage of an airplane.

In yet another embodiment, the probe could be provided as part of the wing of an airplane. For instance, the sensing member 516 can be in the form of an aluminum sheet forming part of a skin of an aircraft. A base 550 of non-thermally conductive material can be supported internally to the sensing member 516, a heat source 548 can be sandwiched between the sensing member and the base and a temperature sensor 520 can be positioned to determine a temperature of the sensing member 516. When icing is detected it could serve as an indicator for the pilot to either turn on the anti-icing or de-icing mechanisms or change altitude to avoid any further icing accumulations. FIG. 13 presents such an embodiment where a thermally insulating material is provided to direct the heat from the heat source to the sensing portion, which can alleviate some of the complexities of modelling this embodiment.

It will be noted that a method taught herein can be used in order to determine an icing condition status of an environment to which a wind farm is exposed, for instance, as a basis to activate appropriate anti-icing or de-icing techniques.

As can be understood, the examples described above and illustrated are intended to be exemplary only. The scope is indicated by the appended claims.

What is claimed is:

1. A method for determining an icing condition value using at least a first sensing member and a second sensing member both being exposed to conditions in an environment, the method comprising:
   while at least the second sensing member is in an ice-free state, measuring a test value of a variable indicative of a thermal state of the first sensing member;
   simultaneously to said measuring the test value, measuring a reference value of a variable indicative of a thermal state of the second sensing member;
   processing at least both the measured test value and the measured reference value to determine the icing condition value and generating a signal based on the icing condition value; and
   monitoring a time elapsed from a determination of a presence of icing until said icing condition value changes to an absence of icing,
   wherein the icing condition value is indicative of the presence of icing and is based upon said processing yielding the determination that the measured test value is different from an expected value.

2. The method of claim 1, further comprising: prior to said steps of measuring, heating at least the second sensing member to free it of ice accumulation.

3. The method of claim 1, wherein the second sensing member and the first sensing member have a different size and/or shape having previously been determined to result in a different thermal state reaction when exposed to environmental air having a wind speed, temperature and liquid water content, further comprising measuring a temperature value of the air of the environment during the simultaneous measurements, wherein the processing further includes processing the temperature value, and calculating at least one of the liquid water content and the wind speed of the air of the environment with the measured temperature value of the air of the environment.

4. The method of claim 1, wherein the first sensing member and the second sensing member react differently to conditions to which they are exposed in the environment and thus having different thermal states during the simultaneous measuring.

5. The method of claim 1, wherein the processing is performed by a computer and includes accessing calibration data stored in a computer readable memory.

6. The method of claim 1, wherein the icing condition value is indicative of an instrumental icing condition of the first sensing member, and the measured reference value is associated to the expected value which is predetermined to correspond to the measured test value if the first sensing member is also in an ice-free state.

7. The method of claim 6, wherein the steps of measuring the test value and measuring the reference value are performed when the corresponding thermal states of the first sensing member and of the second sensing member are at thermal equilibrium.

8. The method of claim 6, wherein the variable indicative of the thermal state of the first sensing member is a temperature of the first sensing member, and the variable indicative of the thermal state of the second sensing member is a temperature of the second sensing member.

9. The method of claim 8, wherein the first sensing member and the second sensing member are identical.

10. The method of claim 8, wherein the expected value is equal to the reference value.

11. The method of claim 6, wherein, during a given period of time during which the thermal states of the first sensing member and the second sensing member vary, a difference between the measured test value and the expected value is monitored based on said processing, wherein the processing further comprises characterizing the icing condition value based on said monitored difference.

12. The method of claim 11, wherein the thermal states vary due to environmental variations.

13. The method of claim 11, wherein the step of processing includes characterizing at least one of an intensity of an icing event, an amount of accumulated ice, a direction of accumulated ice and a type of accumulated ice based on said monitoring.

14. A method for determining an icing condition value using at least a first sensing member and a second sensing member both being exposed to conditions in an environment, the method comprising:
   while at least the second sensing member is in an ice-free state, measuring a test value of a variable indicative of a thermal state of the first sensing member;
   simultaneously to said measuring the test value, measuring a reference value of a variable indicative of a thermal state of the second sensing member; and
   processing at least both the measured test value and the measured reference value to determine the icing condition value and generating a signal based on the icing condition value,
   wherein the icing condition value is indicative of an instrumental icing condition of the first sensing member, and the measured reference value is associated to an expected value which is predetermined to correspond to the measured test value if the first sensing member is also in an ice-free state, and
   wherein the first sensing member and the second sensing member are identical and the conditions to which the first sensing member and the second sensing member are exposed include an equal controlled amount of positive or negative thermal power while maintaining the first sensing member below 0° C. during said steps of measuring the test value and measuring the reference value.

15. The method of claim 14, wherein the variable indicative of the thermal state of the first sensing member and of the second sensing member is a controlled amount of thermal power provided to the corresponding sensing members to reach a temperature target, further comprising measuring a temperature of the sensing members and controlling the amount of thermal power provided to said sensing members based on both the given temperature target and the measured temperature of the sensing members.

16. A method for determining an icing condition value using at least a first sensing member and a second sensing member both being exposed to conditions in an environment, the method comprising:
   while at least the second sensing member is in an ice-free state, measuring a test value of a variable indicative of athe thermal state of the first sensing member;
   simultaneously to said measuring the test value, measuring a reference value of a variable indicative of athe thermal state of the second sensing member;
   processing at least both the measured test value and the measured reference value to determine the icing condition value and generating a signal based on the icing condition value; and
   wherein the icing condition value is indicative of an instrumental icing condition of the first sensing member, and the measured reference value is associated to an expected value which is predetermined to correspond to the measured test value if the first sensing member is also in an ice-free state;
   wherein the steps of measuring the test value and measuring the reference value are performed when the corresponding thermal states of the first sensing member and of the second sensing member are at thermal equilibrium; and
   wherein the conditions to which at least one of the first sensing member and the second sensing member is exposed include a controlled amount of positive or negative thermal power while maintaining the first sensing member below 0° C., and said thermal equilibrium of the exposed at least one of the first sensing member and the second sensing member is both with the environment and with the controlled thermal power, wherein one of the first sensing member and the second sensing member are different from one another and a controlled amount of thermal power provided to the first sensing member and to the second sensing member is different, further comprising determining the expected value based on calibration data which provides a compensation for said difference.

17. A method for determining an icing condition value using at least a first sensing member and a second sensing member both being exposed to conditions in an environment, the method comprising:
   while at least the second sensing member is in an ice-free state, measuring a test value of a variable indicative of a thermal state of the first sensing member;
   simultaneously to said measuring the test value, measuring a reference value of a variable indicative of a thermal state of the second sensing member; and
   processing at least both the measured test value and the measured reference value to determine the icing condition value and generating a signal based on the icing condition value,
   wherein the icing condition value is indicative of an instrumental icing condition of the first sensing member, and the measured reference value is associated to than expected value which is predetermined to correspond to the measured test value if the first sensing member is also in an ice-free state,
   wherein, during a given period of time during which the thermal states of the first sensing member and the second sensing member vary, a difference between the measured test value and the expected value is monitored based on said processing, wherein the processing further comprises characterizing the icing condition value based on said monitored difference, and
   wherein the conditions to which each of the first sensing member and the second sensing member is exposed includes a corresponding controlled amount of positive or negative thermal power provided while maintaining the first sensing member below 0° C., wherein the thermal states vary due to variations in the controlled amount of thermal power during the given period of time.

* * * * *